United States Patent
Rehman et al.

(10) Patent No.: US 10,664,881 B2
(45) Date of Patent: *May 26, 2020

(54) METHOD AND SYSTEM FOR EXPOSING DATA USED IN RANKING SEARCH RESULTS

(71) Applicant: eBay Inc., San Jose, CA (US)

(72) Inventors: Muhammad Faisal Rehman, San Jose, CA (US); Olivier G. Dumon, San Francisco, CA (US); Ryan McDonald, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,238

(22) Filed: Dec. 31, 2018

(65) Prior Publication Data

US 2019/0139109 A1    May 9, 2019

Related U.S. Application Data

(63) Continuation of application No. 15/809,589, filed on Nov. 10, 2017, now Pat. No. 10,181,141, which is a
(Continued)

(51) Int. Cl.
*G06Q 30/00* (2012.01)
*G06Q 30/06* (2012.01)
(Continued)

(52) U.S. Cl.
CPC ............. *G06Q 30/06* (2013.01); *G06Q 10/10* (2013.01); *G06Q 30/0282* (2013.01); *G06Q 30/0641* (2013.01)

(58) Field of Classification Search
CPC ....................... G06Q 30/0641; G06Q 30/0282
(Continued)

(56) References Cited

U.S. PATENT DOCUMENTS 7,330,829 B1    2/2008  Tenorio
7,836,050 B2   11/2010  Jing et al.
(Continued)

FOREIGN PATENT DOCUMENTS

WO        2010/118167 A1    10/2010

OTHER PUBLICATIONS

PR Newswire: "Content Analysis Tool for Search Engine Optimization Now Available: New predictive content analysis application from Ecordia provides writers with SEO verification capabilities prior to publishing on search engines." Sep. 11, 2009; ProQuest Dialog #453563710, 4pgs. (Year: 2009).*

(Continued)

*Primary Examiner* — Robert M Pond
(74) *Attorney, Agent, or Firm* — Shook, Hardy & Bacon LLP

(57) ABSTRACT

Methods and systems enable access to listing performance data used in conjunction with a search engine to order search results. A request for listing performance data for a specific item listing from a seller is received from a client computing system. The request specifies a keyword and/or a category. The request is processed to retrieve the listing performance data corresponding to the specific item listing, and a position value is determined that indicates a position at which the specific item listing would appear to a potential buyer in a search results listing having a plurality of item listings based on a search using the keyword and/or the category. The listing performance data and position value are transmitted to the client computing system for presentation to the seller.

20 Claims, 8 Drawing Sheets

Related U.S. Application Data continuation of application No. 12/571,214, filed on Sep. 30, 2009, now Pat. No. 9,846,898.

(51) Int. Cl.
*G06Q 10/10* (2012.01)
*G06Q 30/02* (2012.01)

(58) Field of Classification Search
USPC .......................................... 705/26, 27, 347
See application file for complete search history.

(56) References Cited

U.S. PATENT DOCUMENTS

| | | | |
|---|---|---|---|
| 7,962,462 | B1 | 6/2011 | Lamping et al. |
| 8,423,541 | B1 | 4/2013 | Baluja et al. |
| 8,577,755 | B2 | 11/2013 | Wiesinger |
| 8,903,816 | B2 | 12/2014 | Dumon et al. |
| 9,672,554 | B2 | 6/2017 | Dumon et al. |
| 9,846,898 | B2 | 12/2017 | Rehman et al. |
| 10,181,141 | B2 | 1/2019 | Rehman et al. |
| 2002/0198875 | A1 | 12/2002 | Masters |
| 2003/0195877 | A1 | 10/2003 | Ford et al. |
| 2005/0004889 | A1 | 1/2005 | Bailey et al. |
| 2005/0038717 | A1 | 2/2005 | Mcqueen et al. |
| 2005/0154718 | A1 | 7/2005 | Payne et al. |
| 2006/0101102 | A1 | 5/2006 | Su et al. |
| 2006/0143197 | A1 | 6/2006 | Kaul et al. |
| 2006/0224593 | A1 | 10/2006 | Benton et al. |
| 2007/0033531 | A1 | 2/2007 | Marsh |
| 2007/0150470 | A1 | 6/2007 | Brave et al. |
| 2007/0192314 | A1 | 8/2007 | Heggem |
| 2008/0072180 | A1 | 3/2008 | Chevalier et al. |
| 2008/0168052 | A1 | 7/2008 | Ott et al. |
| 2008/0275864 | A1 | 11/2008 | Kim et al. |
| 2008/0288348 | A1 | 11/2008 | Zeng et al. |
| 2009/0265243 | A1 | 10/2009 | Karassner et al. |
| 2010/0057717 | A1 | 3/2010 | Kulkarni |
| 2010/0223125 | A1 | 9/2010 | Spitkovsky |
| 2010/0262602 | A1 | 10/2010 | Dumon et al. |
| 2011/0078049 | A1 | 3/2011 | Rehman et al. |
| 2011/0275393 | A1 | 11/2011 | Ramer et al. |
| 2015/0058174 | A1 | 2/2015 | Dumon et al. |
| 2018/0068360 | A1 | 3/2018 | Rehman et al. |

OTHER PUBLICATIONS

Non-Final Office Action Received for U.S. Appl. No. 15/809,589 dated May 16, 2018, 9 pages.
Notice of Allowance received for U.S. Appl. No. 15/809,589, dated Sep. 13, 2018, 6 pages.
Response to Non-Final Office Action filed on Aug. 2, 2018, for U.S. Appl. No. 15/809,589, dated May 16, 2018, 8 pages.
Advisory Action received for U.S. Appl. No. 12/476,046 dated Mar. 3, 2014, 3 pages.
Applicant Initiated Interview Summary received for U.S. Appl. No. 12/476,046, dated Jun. 26, 2014, 3 pages.
Final Office Action received for U.S. Appl. No. 12/476,046, dated Oct. 2, 2013, 16 pages.
Notice of Allowance received for U.S. Appl. No. 12/476,046, dated Aug. 1, 2014, 9 pages.
Response to Final Office Action filed on Feb. 3, 2014 for U.S. Appl. No. 12/476,046, dated Oct. 2, 2013, 12 pages.
Response to Final Office Action filed on Jun. 30, 2014 for U.S. Appl. No. 12/476,046, dated Oct. 32, 2013, 11 pages.
Applicant Initiated Interview Summary received for U.S. Appl. No. 14/530,482, dated Jan. 26, 2017, 3 pages.
Final Office Action received for U.S. Appl. No. 14/530,482, dated Sep. 26, 2016, 11 pages.
Non-Final Office Action received for U.S. Appl. No. 14/530,482, dated Mar. 28, 2016, 13 pages.
Notice of Allowance received for U.S. Appl. No. 14/530,482, dated Feb. 9, 2017, 9 pages.
Preliminary Amendment for U.S. Appl. No. 14/530,482, filed on Feb. 25, 2015, 6 pages.
Response to Final Office Action filed on Jan. 26, 2017 for U.S. Appl. No. 14/530,482, dated Sep. 26, 2016, 8 pages.
Response to Non-Final Office Action filed on Jul. 28, 2016 for U.S. Appl. No. 14/530,482, dated Mar. 28, 2016, 10 pages.
Preliminary Amendment for U.S. Appl. No. 15/613,946, filed Jun. 6, 2017, 6 pages.
"2014 Interim Guidance on Patent Subject Matter Eligibility", vol. 79, No. 241, Retrieved from the Internet URL: <https://www.federalregister.gov/documents/2014/12/16/2014-29414/2014-interim-guidance-on-patent-subject-matter-eigibility>, Dec. 16, 2014, pp. 74618-74633.
"Jul. 2015 Update: Interim Eligibility Guidance", Retrieved from the Internet URL: Jul. 2015, 2 pages.
Applicant Initiated Interview Summary received for U.S. Appl. No. 12/571,214, dated Jun. 28, 2017, 3 pages.
Final Office Action received for U.S. Appl. No. 12/571,214, dated Apr. 2, 2015, 23 pages.
Final Office Action received for U.S. Appl. No. 12/571,214, dated Aug. 11, 2016, 10 pages.
Final Office Action received for U.S. Appl. No. 12/571,214, dated May 10, 2017, 18 pages.
Final Office Action received for U.S. Appl. No. 12/571,214, dated May 20, 2013, 18 pages.
Non-Final Office Action received for U.S. Appl. No. 121571,214, dated Feb. 23, 2016, 26 pages.
Non-Final Office Action received for U.S. Appl. No. 12/571,214, dated Feb. 29, 2012, 9 pages.
Non-Final Office Action received for U.S. Appl. No. 12/571,214, dated Jul. 18, 2014, 17 pages.
Non-Final Office Action received for U.S. Appl. No. 12/571,214, dated Nov. 14, 2012, 10 pages.
Non-Final Office Action received for U.S. Appl. No. 12/571,214, dated Oct. 28, 2016, 17 pages.
Notice of Allowance received for U.S. Appl. No. 12/571,214, dated Aug. 10, 2017, 10 pages.
Response to Final Office Action filed on Aug. 20, 2013, for U.S. Appl. No. 12/571,214, dated May 20, 2013, 10 pages.
Response to Final Office Action filed on Aug. 25, 2015, for U.S. Appl. No. 12/571,214, dated Apr. 2, 2015, 11 pages.
Response to Final Office Action filed on Jul. 14, 2017, for U.S. Appl. No. 12/571,214, dated May 10, 2017, 10 pages.
Response to Final Office Action filed on Oct. 11, 2016, for U.S. Appl. No. 12/571,214, dated Aug. 11, 2016, 10 pages.
Response to Non-Final Office Action filed on Aug. 29, 2012, for U.S. Appl. No. 12/571,214, dated Feb. 29, 2012, 11 pages.
Response to Non-Final Office Action filed on Dec. 18, 2014, for U.S. Appl. No. 12/571,214, dated Jul. 18, 2014, 13 pages.
Response to Non-Final Office Action filed on Feb. 14, 2013, for U.S. Appl. No. 12/571,214, dated Nov. 14, 2012, 11 pages.
Response to Non-Final Office Action filed on Jan. 24, 2017, for U.S. Appl. No. 12/571,214, dated Oct. 28, 2016, 10 pages.
Response to Non-Final Office Action filed on May 23, 2016, for U.S. Appl. No. 12/571,214, dated Feb. 23, 2016, 16 pages.
Response to Restriction Requirement filed on Feb. 6, 2012, for U.S. Appl. No. 12/571,214, dated Jan. 5, 2012, 8 pages.
Restriction Requirement received for U.S. Appl. No. 12/571,214, dated Jan. 5, 2012, 6 pages.
Blankenbake, et al., "Paid search for online travel agencies Exploring strategies for search keywords", Journal of Revenue and Pricing Management, Mar. 2009, 13 pages.
Ebay, "Internet Archive Wayback Machine", www.archive.org; www.ebay.com, 2007, 18 pages.
Bay, "The World's Online Marketplace", Internet Archive Wayback Machine, Feb.-Mar. 2007, 27 pages.
PR Newswire, "Content Analysis Tool for Search Engine Optimization Now Available: New predictive content analysis application from Ecordia provides writers with SEO verification capabilities prior to publishing on search engines", Sep. 11, 2009, 4 pages.

(56) References Cited

OTHER PUBLICATIONS

Advisory Action received for U.S. Appl. No. 12/476,046, dated Feb. 23, 2012, 3 pages.
Final Office Action received for U.S. Appl. No. 12/476,046, dated Oct. 31, 2011, 18 pages.
Non-Final Office Action received for U.S. Appl. No. 12/476,046, dated Apr. 28, 2011, 15 pages.
Non-Final Office Action received for U.S. Appl. No. 12/476,046, dated Apr. 30, 2012, 15 pages.
Non-Final Office Action received for U.S. Appl. No. 12/476,046, dated Mar. 20, 2013, 13 pages.
Response to Final Office Action filed on Jan. 31, 2012, for U.S. Appl. No. 12/476,046, dated Oct. 31, 2011, 10 pages.
Response to Non-Final Office Action filed on Aug. 29, 2012, for U.S. Appl. No. 12/476,046, dated Apr. 30, 2012, 13 pages.
Response to Non-Final Office Action filed on Jul. 22, 2013, for U.S. Appl. No. 12/476,046, dated Mar. 20, 2013, 12 pages.
Response to Non-Final Office Action filed on Jul. 28, 2011, for U.S. Appl. No. 12/476,046, dated Apr. 28, 2011, 10 pages.
International Preliminary Report on Patentability received for PCT Application No. PCT/US2010/030287, dated Oct. 20, 2011, 6 pages.
International Search Report received for PCT Application No. PCT/US2010/030287, dated Jun. 9, 2010, 4 pages.
Written Opinion received for PCT Application No. PCT/US2010/030287, dated Jun. 9, 2010, 6 pages.
Non Final Office Action Received for U.S. Appl. No. 15/613,946, dated Dec. 12, 2019, 11 pages.

* cited by examiner

FIGURE 7

METHOD AND SYSTEM FOR EXPOSING DATA USED IN RANKING SEARCH RESULTS

CROSS-REFERENCE TO RELATED APPLICATIONS

This patent application is a continuation of U.S. patent application Ser. No. 15/809,589, filed Nov. 10, 2017, which is a continuation of U.S. patent application Ser. No. 12/571,214, filed Sep. 30, 2009 (issued as U.S. Pat. No. 9,846,898), each of which is incorporated herein by reference in its entirety. The present application is also related by subject matter to U.S. patent application Ser. No. 12/476,046, filed Jun. 1, 2009 (issued as U.S. Pat. No. 8,903,816), which claims priority to U.S. Provisional Application No. 61/167,796, filed on Apr. 9, 2009, which are also incorporated herein by reference in their entirety.

TECHNICAL FIELD

The present disclosure generally relates to data processing systems and techniques. More specifically, the present disclosure relates to methods and systems for exposing data that is used by a search engine to order search results for display in a search results page.

BACKGROUND

A search engine is a software-based tool designed to aid in the search for information. For example, a web search engine is designed to search for web pages relevant to a user's search query. Generally, a search engine is evaluated based on the quality of the search results it provides in response to a user-provided search query. To ensure that the best (most relevant) search results are positioned first in a list of search results, a search engine may utilize a complex algorithm and rely on a variety of different types of data when ordering the search results for presentation on a search results page. For those interested in having a particular search result displayed prominently at the top of the search results page, understanding the underlying algorithms and data upon which a search engine relies in ranking search results is critical.

Search engines are frequently utilized by e-commerce sites to enable users (e.g. potential buyers) to find items (e.g., products and/or services) of interest. For those that are selling items on e-commerce sites that bring together sellers and buyers, understanding how a search engine works and being familiar with the underlying data used to order search results can help to improve a seller's chances of having items appear in the search results page, and ultimately increase the chances that items will be purchased. For instance, if a seller is familiar with the underlying algorithms and data upon which search engines rely in ordering search results, the seller can manipulate his or her item listings to increase the likelihood that an item listing will appear in a prominent position within the search results pages, and ultimately increase the odds that an item will be purchased. However, with conventional e-commerce marketplaces, a seller does not have access to any of the underlying data utilized by the search engine in ranking, and ordering, search results on a search results page.

BRIEF DESCRIPTION OF THE DRAWINGS

Some embodiments are illustrated by way of example and not limitation in the figures of the accompanying drawings, in which:

FIGS. 5, 6 and 7 illustrate example user interfaces for a listing performance analysis application, according to an embodiment of the invention.

DETAILED DESCRIPTION

Figure 1:
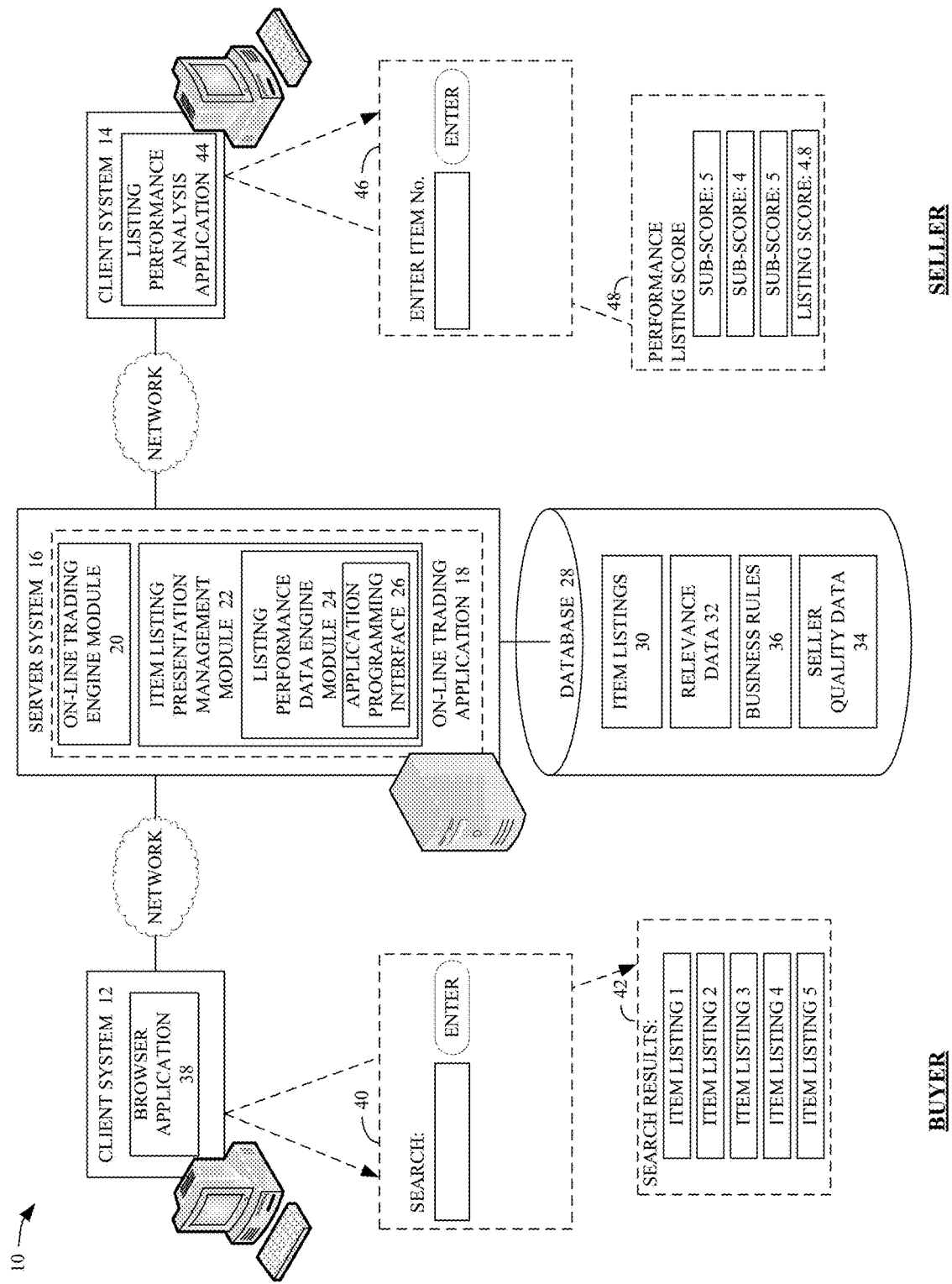
FIG. 1 is a block diagram of a network environment for hosting an e-commerce or on-line trading application, including a server system and two client systems, with which an embodiment of the invention might be implemented.

Methods and systems for exposing data that is used by a search engine to order search results for display in a search results page are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Consistent with some embodiments of the invention, an e-commerce or online trading application includes an application programming interface (API) that provides access to data used by a ranking algorithm of a search engine when ordering search results for display in a search results page. For instance, in some embodiments, the e-commerce or online trading application includes a search engine that allows users to search for item listings. The search engine utilizes a ranking algorithm (referred to herein as a listing performance algorithm) to assign a ranking score (referred to herein as a listing performance score) to each item listing that satisfies a query. For example, after selecting the search results (e.g., item listings) that satisfy a user-initiated search query, a listing performance score is assigned to each search result in the result set. When the item listings are presented to a user in a search results page or pages, the item listings are ordered based on the listing performance scores assigned to the individual item listings in the result set. For example, in some embodiments, those item listings with the highest listing performance scores will be displayed at the top of a list of search results on the first page of what might be several pages of search results.

To enable sellers who have listed items for sale via the on-line trading application to access and analyze the data that affects an individual item listing's ranking score, the online trading application includes a listing performance data engine module that is made accessible via an open API. Accordingly, a software application leveraging the API can make data requests to the listing performance data engine module. As such, sellers are provided access to data that is used in generating an individual item listing's listing performance score, thereby providing insight into why a particular item listing is presented in the search results pages at a particular page and/or position. For instance, if a seller desires to understand why a particular item listing it not listed on the first page of the search results pages, the seller might utilize a listing performance analysis application to query the listing performance data engine module for listing performance data that affects the listing performance score of one or more item listings. With an understanding of how the underlying algorithm uses the data, a seller can determine whether it may be possible to modify one or more attributes of his or her item listing to increase the item listing's listing performance score, thereby improving the page and/or position on which the item is shown in the search results page for a specific query, and ultimately increasing the likelihood that the item listing will result in a transaction (e.g., sale).

In addition, the open API provides third party software developers with the required interface for developing third party software tools for performing analysis of item listings and associated performance data associated with the item listings. In general, the data that is accessible via the data engine and API is one of two types—attribute data that is input or selected by the buyer, for example, when listing an item for sale, and performance data that is derived as a result of various activities and actions that are detected by the online trading application. For example, the attribute data for the item listing may include such data items as: the title of the item listing, the item number assigned to the item listing, the price of the item being offered, the shipping method and/or cost, the total quantity of items listed or available, the listing start date, the pricing format (e.g., fixed price or auction), and the category in which the item has been listed. The performance data may include such data items as: the number of impressions the item listing has received (e.g., the number of times the item listing has been presented in a search result set to a user), the number of times a unique user has selected (e.g., clicked on) the item listing when presented in a search result set (e.g., referred to as the click-through count), the ratio of click-through count to impressions (e.g., referred to as the click-through rate), the number of unique users monitoring or tracking the item listing (e.g., referred to as the watch count), the number of sales generated by the item listing, the quantity of items sold, the number of sales per the number of impressions, the number of sales per unique click-through count, and so forth. By combining the API described herein with one or more other API's made available by the operator of the online trading application, a third party software developer may develop a fully- or semi-automated performance analyzer or monitor for item listings. Collectively, the two types of data (e.g., attribute data, and performance data) are referred to herein as listing performance data. Other aspects and advantages of the inventive subject matter will become readily apparent from the description of the figures that follow.

FIG. 1 is a block diagram of a network environment 10 including two network-connected client systems 12 and 14, as well as a server system 16, with which an embodiment of the invention might be implemented. As illustrated in FIG. 1, the server system 16 is shown to include an on-line trading application 18. In this example, the online trading application 18 is comprised of two primary modules—an on-line trading engine module 20, and an item listing presentation management module 22. In addition, the item listing presentation management module 22 is shown to include a listing performance data engine module 24 and an application programming interface 26.

In some embodiments, the on-line trading engine module 20 may consist of a variety of sub-components or modules, which provide some of the functions of an on-line trading application 18. As described more completely below, each module may be comprised of software instructions, computer hardware components, or a combination of both. To avoid obscuring the invention in unnecessary detail, only a few of the on-line trading engine functions are described herein. For example, the on-line trading engine module 20 may include an item listing management module (not shown) that facilitates the receiving and storing of data representing item attributes, which collectively form an item listing. When a user desires to list a single item, or multiple items, for sale, the user will provide information about the item(s) (e.g., item attributes). Such information may be submitted via one or more forms of one or more web pages, or via drop down lists, or similar user interface elements. The item listing management module receives the item attributes and stores the item attributes together within a database 28 as an item listing. In some instances, the item listings may be stored in an item listing database table 30. As described in greater detail below, the item attributes of each item listing are analyzed and used as inputs to one more algorithms used to assign a ranking score to item listings, which in turn is used in determining the position of item listings when the item listings are being presented in a set of search results pages.

The on-line trading engine module 18 may also include one or more modules for receiving and storing historical data, generally representing user-initiated activities and/or events detected at the online trading application, that is used to measure the likelihood that an item listing will, if presented in a search results page, result in a transaction being concluded. For instance, in some embodiments, data associated with user-initiated activities are analyzed and captured for the purpose of predicting future user activities. If a user submits a search request including certain search terms, and then proceeds to conclude a transaction for a particular item (e.g., purchase the item), information from the user's interaction with the online trading application will be captured and stored for the purpose of predicting future actions by other users. Some of the data used in this capacity is generally referred to as relevance data 32 because it is used to determine a measure of relevance between search terms used in a search query, and individual item listings. For instance, if a potential buyer submits a search request with the search terms, "mobile phone", item listings that have certain item attributes are more likely to result in the conclusion of a transaction if presented in a search results page in response to the search request. For instance, continuing with the example search terms, "mobile phone", given the specific search terms used in the search query, item listings that have been designated as being in a certain category of items, such as "Electronics", or even more specifically, "Mobile Phones", are more likely to result in a transaction if presented in a search results page than item listings in other categories, for example, such as "Automobiles" or "Jewelry". Similarly, given the search terms, "mobile phone", item listings with titles that include the search terms may prove more likely to result in a transaction than item listings without the search terms in the title. Accordingly, in some embodiments, the on-line trading engine 18 includes one or more modules for receiving and analyzing historical data to generate what is referred to herein as relevance data. The relevance data is used to derive a measure of the likelihood that item listings with certain item attributes will result in a transaction if displayed in response to certain search terms being submitted in a search request. The derived measure of relevance may take the form of a number representing a score, which can be exposed to a seller via a third-party application that utilizes an API consistent with an embodiment of the invention.

The on-line trading engine module 18 may also include one or more modules for receiving and storing data representing, among other things, a measure of a seller's performance of obligations associated with transactions in which the seller has participated. For instance, in some embodiments, when a transaction is concluded, a buyer may be prompted to provide feedback information concerning the performance of a seller. The buyer may, for example, rate the accuracy of the seller's description of an item provided in the item listing. For instance, if the item received by the buyer is in poor condition, but was described in the item listing as being in good condition, the buyer may provide feedback information to reflect that the seller's description of the item in the item listing was inaccurate. As described more fully below, this seller performance information may be used in a variety of ways to derive a ranking score for an item listing. For instance, in some cases, the seller feedback information may be used to determine a ranking score for another item listing of the same seller. Such information may be stored in a database 28, as indicated in FIG. 1 by the seller quality data with reference number 34. Accordingly, this information may be accessible to a seller for viewing and analyzing via a third-party application that utilizes an API consistent with an embodiment of the invention.

As illustrated in FIG. 1, the database 28 is also shown to include business rules data 36. The business rules data 36 is managed and used by a business rules management module for the purpose of promoting and/or demoting item listings that satisfy a search query. For instance, when determining the order or arrangement of item listings for presentation on a search results page, an item listing may be promoted—presented in a more prominent position—or, demoted—presented in a less prominent position—based on the evaluation of a business rule that is dependent upon certain business rule data. In some embodiments, item attributes and seller attributes may be used in conjunction with business rule data, for the purpose of evaluating business rules. In some embodiments, the promotion or demotion may be effected by multiplying a business rules score and a ranking score. Business rules may be used to promote certain business policies and to impact user's behavior. For instance, a business rule that provides a promotion to item listings that are offering free shipping will likely have the effect of persuading sellers to offer free shipping to have their item listings appear in the most prominent positions of the search results page. Similarly, demoting item listings based on negative seller feedback information will typically motivate sellers to perform their obligations as agreed upon. In some embodiments of the invention, the result of the evaluation of a business rule may be made available to users via the API. For example, in some embodiments, when an item listing includes free shipping to the buyer of the item, a business rule may evaluate to TRUE, resulting in an increase to the listing performance score for that item listing. Accordingly, this information may be displayed to a user via an API call, thereby informing the user of how the free shipping, or lack of free shipping, is ultimately affecting the performance of the user's item listing.

Referring again to FIG. 1, the second primary module of the on-line trading application 18 is an item listing presentation management module 22. The item listing presentation management module 22 provides the logic used to assign a ranking score (synonymously referred to as a Best Match Score or a Listing Performance Score) to item listings that satisfy a search query, and to use the ranking score to determine the order of item listings when the item listings are presented in a search results page.

For instance, in some embodiments, a potential buyer operates a web browser application 38 on a client system 12 to interact with the on-line trading application residing and executing on the server system 16. As illustrated by the example user interface with reference number 40, a potential buyer may be presented with a search interface 40, with which the user can specify one or more search terms to be used in a search request submitted to the on-line trading application 18. In some embodiments, in addition to specifying search terms, users may be able to select certain item attributes, such as the desired color of an item, the item categories that are to be searched, and so on. After receiving and processing the search request, the on-line trading application 18 communicates a response to the web browser application 38 on the client system 12. For instance, the response is an Internet document or web page that, when rendered by the browser application 38, displays a search results page 42 showing several item listings that satisfy the user's search request. As illustrated in the example search results page 42 of FIG. 1, the item listings are arranged or positioned on the search results page in an order determined by the item listing presentation management module 22. The item listings are, in some embodiments, presented by a presentation module, which may be a web server or an application server.

In general, the item listings are presented in the search results page in an order based on a ranking score that is assigned to each item listing that satisfies the query. In some embodiments, the item listings will be arranged in a simple list, with the item listing having the highest ranking score appearing at the top of the list, followed by the item listing with the next highest ranking score, and so on. In some embodiments, several search results pages may be required to present all item listings that satisfy the query. Accordingly, only a subset of the set of item listings that satisfy the query may be presented in the first page of the search results pages. In some embodiments, the item listings may be ordered or arranged in some other manner, based on their ranking scores. For instance, instead of using a simple list, in some embodiments the item listings may be presented one item listing per page, or, arranged in a grid, or in some manner other than a top-down list.

As described in greater detail below, the ranking score may be based on several component scores or sub-scores including, but by no means limited to: a relevance score, representing a measure of the relevance of an item listing with respect to search terms provided in the search request; a listing quality score, representing a measure of the likelihood that an item listing will result in a transaction based at least in part on historical data associated with similar item listings; and, a business rules score, representing a promotion or demotion factor determined based on the evaluation of one or more business rules. As used herein, a component score or sub-score is a score that is used in deriving the overall ranking score for an item listing. However, a component score in one embodiment may be a ranking score in another embodiment. For instance, in some embodiments, the ranking score may be equivalent to a single component score, such as the listing quality score. Similarly, in some embodiments, the ranking score may be equivalent to the business rules score.

As illustrated in FIG. 1, a seller who has one or more active item listings may utilize a listing performance analysis application 44 executing on a client system 14 to retrieve, view and analyze data associated with item listings of the online trading application 18. In particular, the listing performance analysis application 44 may utilize an open API 26 that defines and provides a set of commands that can be utilized to request listing performance data from the listing performance data engine module 24. For example, and as illustrated in FIG. 1, the listing performance analysis application 44 may provide a seller with a user interface 46 that facilitates generating queries for data. In general, a seller can request listing performance data by an item listing number, by a category, by keyword, or by some combination of these. For instance, as one example, a user may simply enter an item number known to be associated with a particular item listing for which the seller would like to retrieve and view listing performance data. By submitting a query, via an API call, to the listing performance data engine module 24 with the item listing number, the seller is presented with information associated with the item listing associated with that item listing number. As shown by user interface 48 in FIG. 1, the user may be presented with a variety of information, such as sub-scores, that is used by a ranking algorithm to derive a ranking score or listing performance score that is used when ordering search results for display in a search results page.

Figure 2:
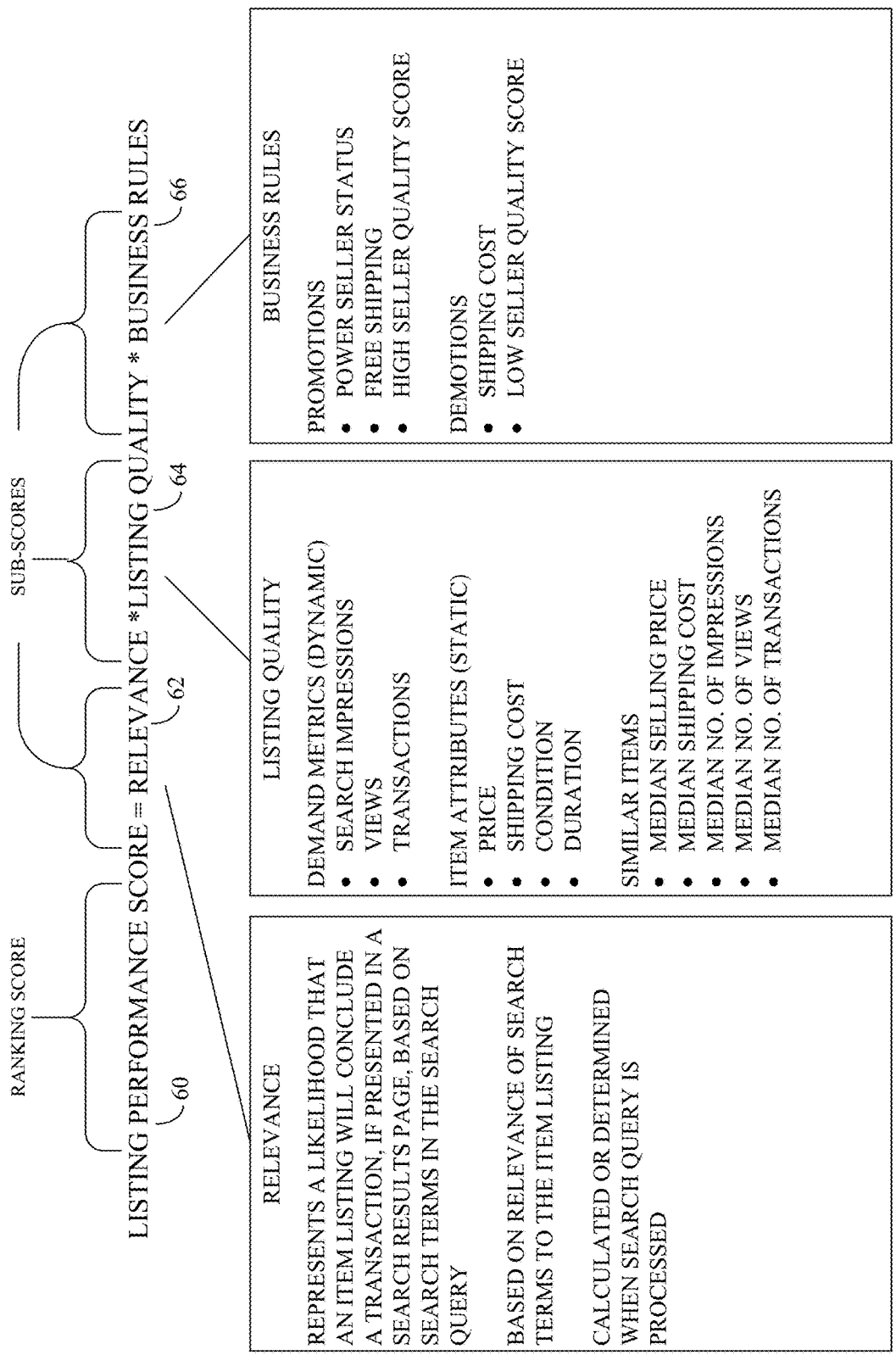
FIG. 2 illustrates an example of a formula or equation, which is used to derive a ranking score for ordering search results, in some embodiments of the invention.

FIG. 2 illustrates an example of a formula or equation, which is used in a ranking algorithm to derive a ranking score for ordering search results, in some embodiments of the invention. Throughout the present disclosure, and consistent with embodiments of the invention, the ranking score may be referred to as a Best Match Score, or alternatively, a Listing Performance Score. In various embodiments, the specific nature and type of data that may be used in a ranking algorithm, and might be made accessible to users via an API, will vary greatly. Therefore, it will be readily appreciated that the example presented in FIG. 2 is but one of many possibilities and the particular data elements described in connection with FIG. 2 are simply examples of the nature and type of data that could be made accessible via an API, consistent with some embodiments of the invention.

In some embodiments, when processing a query resulting from a potential buyer's search request, the item listings that satisfy the search request are ordered or otherwise positioned or arranged in a search results page (e.g., an Internet document or web page) based on a listing performance score calculated for, and assigned to, each item listing. For instance, in response to receiving and processing a search request, one or more algorithms are used to assign listing performance scores to each item listing that satisfies the search request. The listing performance scores assigned to the item listings that satisfy the search request are then used to determine where each individual item listing is to appear when presented to a user in a search results page. Accordingly, in some embodiments, the item listings that are assigned the highest ranking scores are placed in the positions deemed to be most prominent, and therefore most likely to be seen and selected by a user. For example, the item listings with the highest ranking scores may be positioned at the top of a first page of several search results pages that together comprise a long list of item listings that satisfy a potential buyer's search request.

In some embodiments, the ranking score is itself comprised of several sub-scores or component scores. For instance, as illustrated in FIG. 2, a ranking score (e.g., Listing Performance Score 60) may be calculated as the product of a relevance score 62, listing quality score 64 and business rules score 66.

As illustrated in FIG. 2, the ranking score is based in part on a relevance score 62. The relevance score 62 is a measure of the relevance of an item listing, in light of the search terms submitted by the user. The relevance score may be based on an analysis of an item listing's title (e.g., title relevance) as well as an item listing's item description, and historical data indicating how users have previously interacted with item listings having similar item attributes when those item listings were previously presented in a search results page. The relevance score 62 is calculated at the time the search query is processed. Thus, in some embodiments, when the set of item listings satisfying the query are returned, the item listings are associated with a corresponding relevance score 62, and may be ordered based on their corresponding relevance scores 62. Accordingly, when a relevance score for an item listing is made available via the API, it is based on a keyword query. That is, in some embodiments, a seller may query for a relevance score based on one or more keywords. In return, the seller is presented with a page and page position at which the seller's item listing would be presented, if a potential buyer was to perform a query containing the keywords.

As illustrated in FIG. 2, the ranking score is also based in part on a listing quality score 64. The listing quality score 64, represents a measure of the quality of the item listing. For instance, the listing quality score represents the likelihood (expressed as a probability in some instances) that an item listing will result in conclusion of a transaction, if presented in a search results page. In some embodiments, the listing quality score is computed as a weighted sum of a predicted score—based on item attributes known at listing time—and, an observed score—based on actual performance of the item listing, or item listings determined to be similar.

The part of the listing quality score representing the predicted score is based on an analysis of item attributes of the item listing, in comparison with item attributes of item listings determined to be similar. Although many item attributes may be considered in various embodiments, in some embodiments the price of the item and the shipping cost are the primary predictors of quality. For instance, the price of an item listing relative to the prices of similar item listings that have previously resulted in transactions is used as a metric to indicate the likelihood that an item listing will result in a transaction. If the price for the item listing is below the median price for similar item listings, the likelihood that a transaction will conclude if the item listing is presented increases. Similarly, if the price for the item listing is greater than the median price for similar item listings, the likelihood of a transaction concluding decreases. The same general analysis can be undertaken for shipping cost as well. In some embodiments, the shipping cost is analyzed separately from the price of the item, and in some cases, the shipping cost and price are summed to derive a total price that is used in the analysis.

The listing quality score is also based in part on an observed score representing a demand metric or combination of demand metrics. A demand metric represents a measure of the demand for an item based at least in part on historical data. For instance, in some embodiments, a demand metric used for calculating a listing quality score is calculated as a ratio of the number of transactions concluded per search impressions for an item listing, or for item listings determined to be similar. For example, in the case of a multi-quantity item listing—that is, an item listing offering multiple items (e.g., one-hundred mobile phones)—the observed demand metric may be derived as the ratio of the number of transactions concluded per the number of search impressions for the item listing. Again referring to the example item listing for a mobile phone, if five out of ten times the item listing is presented in a search results page a buyer concludes a transaction by purchasing a mobile phone, then the transactions per search impressions ratio is fifty percent (50%). This demand metric may be normalized, such that the final observed score takes into consideration the performance of the item listing in relation to the performance of other item listings for similar items. For instance, for certain categories of items (e.g., Automobiles, Coins, Stamps, Mobile Phones, and so on), different observed scores may be interpreted differently. For instance, ratio of the transactions per search impressions with value fifty percent (50%) may be viewed as a "good" ratio, indicating a strong item listing performance, for one category (e.g., Automobiles), but a "bad" ratio, indicating a weak item listing performance for another category (e.g., Mobile Phones).

In general, if the ratio of the number of transactions per search impressions for an item listing is high, the likelihood that the item listing will result in a transaction is also high. However, if the total number of search impressions for a given item listing is low, the confidence in the demand metric may be low. For instance, if the item listing has only one search impression, and that search impression ultimately resulted in a transaction, it may be difficult to predict whether the item listing is a "good" item listing. Accordingly, and as described more completely below, the weighting factor for the demand metric may be a function of the number of search impressions for the item listing, or a metric referred to as time on site (TOS), representing the length or duration of time the item listing has been active.

In some embodiments, the weighting factor is a function of a time-based metric, such that, when the item listing is first listed, the emphasis is on the predicted score, but over time, the emphasis is shifted to the observed score. For example, in some embodiments, the weighting factor is a function of the number of search impressions that an item listing has received. For instance, when the search impression count (i.e., the number of times an item listing has been presented in a search results page) reaches some minimum threshold, the weighting factor applied to the predicted score is decreased, resulting in less emphasis on the predicted score, and the weighting factor applied to the observed metric is increased, resulting in greater emphasis on the observed metric component of the listing quality score.

In some embodiments, the listing quality score, or any of the inputs used to derive the listing quality score, may be made available to a seller who has an active item listing. Specifically, via an API call, a seller may obtain such listing performance data as: an impression count for an item listing, a click-through rate (or, number of views) for the item listing, a number of transactions concluded for the item listing, and/or a number of items sold via the item listing. In addition, various attributes of the item listing may be made available via an API call, including the price of the item offered via the item listing, the shipping method and cost, the condition of the item, and the duration or length of time the listing has been active. These attributes might be compared with aggregate listing performance data for other item listings. For instance, in some embodiments, listing performance data for all item listings that would be displayed in the first page of the search results pages for a particular keyword or category might be presented to a seller. Accordingly, a seller can compare the listing performance data of his or her item listing with the listing performance data of those item listings that would appear on the first page of the search results pages to assess whether there is a particular item attribute that is causing the seller's item listing to not be displayed in the first page of the search results pages.

In addition, to the relevance score and listing quality score, a listing performance score may be affected by the evaluation of one or more business rules, resulting in a business rules score 66. For example, if a seller has a power seller status, or if an item is offered with free shipping, or if a seller has a seller quality score that exceeds a predetermined threshold, a business rule score may positively affect the listing performance score. Similarly, if a seller has a low seller quality score, or an item has a high cost of shipping, a business rules score may result in a demotion of the particular item listing.

In some embodiments, a single algorithm is used to assign a score to each item listing. For example, after determining which item listings satisfy a search request, a single algorithm is used to assign a score to each item listing determined to satisfy the search request. This score (e.g., the Listing Performance Score) is then used to determine the position of each item listing when the item listings are presented to a user, for example, in a search results page. Alternatively, in some embodiments, several algorithms are utilized to assign scores to item listings. For instance, in some embodiments, a separate algorithm is used to assign scores to item listings based on a characteristic of the item listings, such that the algorithm used for any particular item listing is selected based on a particular characteristic or attribute value of the item listing. For instance, when the total population of item listings includes both auction listings and fixed-price listings, one algorithm may be used to assign a score to all item listings that include a fixed price, while a separate algorithm may be used for item listings that are offered at auction. Similarly, with multiple-quantity item listings offered at a fixed price—that is, item listings that offer multiple units of the same item at a fixed price— separate algorithms may be used to assign scores to those item listings that are new—and thus do not have available historical data for assessing the quality of the item listing— and those item listings that are older—and thus have available historical data for assessing the quality of the item listing. Similarly, different algorithms may be used to assign listing quality scores to item listings in different categories. For instance, some categories (e.g., Mobile Phones) may use transactions per search impressions as the observed demand metric for the observed listing quality score, whereas item listings in another category (e.g., Automobiles) may use the ratio of views per search impression as the demand metric for the observed listing quality score.

Any of the individual data items that may affect a listing performance score as described in connection with the description of FIG. 2, including seller and item attribute data provided by a seller when generating an item listing, as well as any data derived from activities and events detected by the online trading application, may be made available to users via an API 26 and the listing performance data engine module 24. In some embodiments, certain data may be withheld, and not made available via the API for various reasons.

Figure 3:
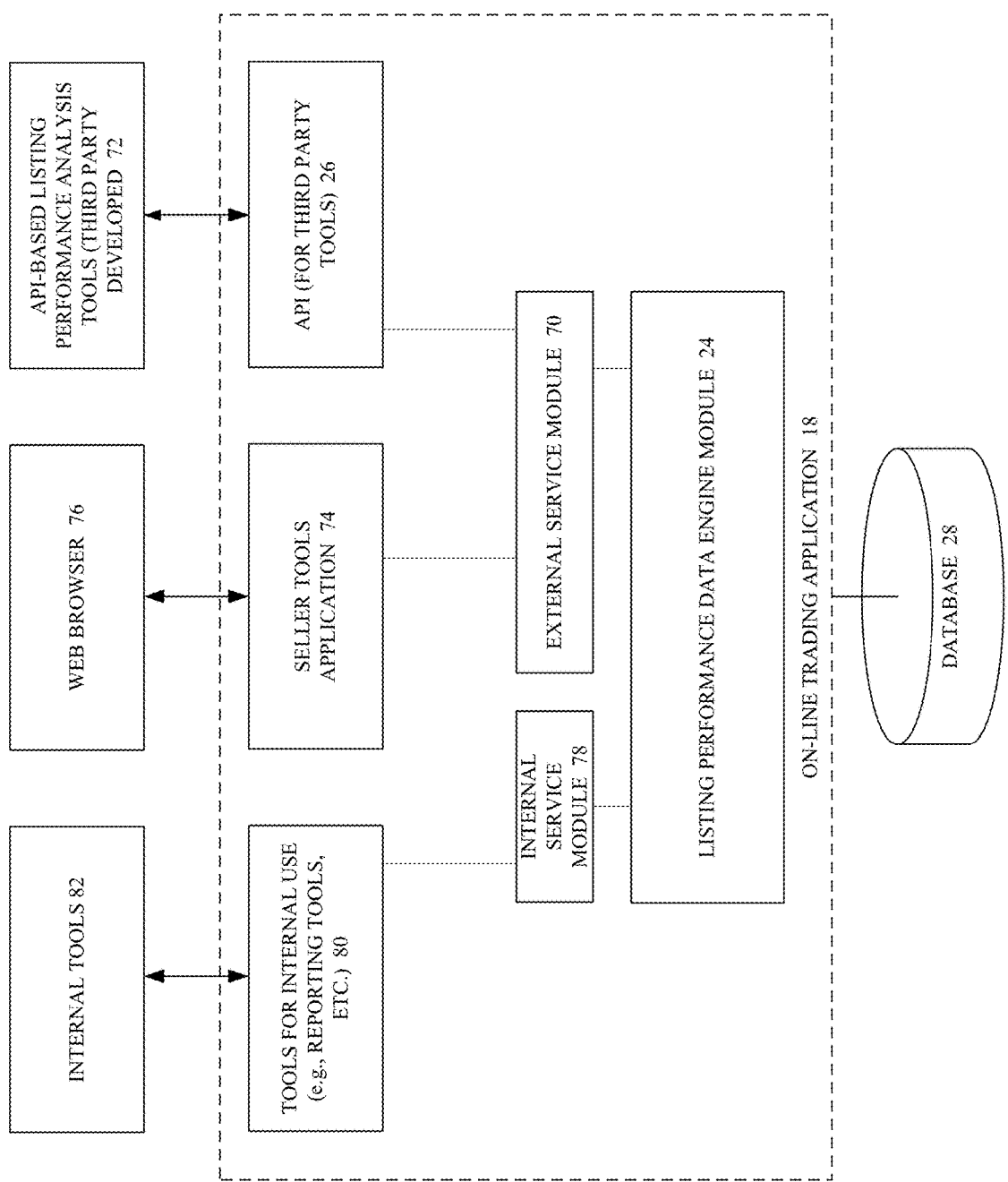
FIG. 3 is a block diagram showing an example software architecture with which a listing performance analysis application might be developed, according to an embodiment of the invention.

FIG. 3 is a block diagram showing an example software architecture with which a listing performance analysis application might be developed, according to an embodiment of the invention. As shown in FIG. 3, in some embodiments of the invention, the listing performance data engine module 24 of the online trading application 18 operates in conjunction with both an internal service module 78 and an external service module 70. Accordingly, the listing performance data engine module might be utilized with a number of internal applications and tools, as well as customer facing applications and tools. In some embodiments, an API is used to provide access to external applications and tools to listing performance data for item listings stored in a database 28. Accordingly, third party application developers have the ability to develop applications using the open API to allow sellers to view and analyze listing performance data associated with their item listings. The API-based listing performance analysis tools 72 may be designed as web-based applications, or alternatively, as native desktop applications. With an understanding of how the underlying listing performance algorithms operate, a seller can utilize the listing performance data retrieved via the API to manipulate his or her item listings with a goal of improving the item listing's overall listing performance score, and ultimately improve the conversion rate (e.g., number of sales) resulting from the item listing.

As illustrated in FIG. 3, the external services module 70, which may be implemented as a web services module, may also be used in conjunction with an application (e.g. seller tools application 74) provided and hosted by the operator of the online trading application 18. For example, the seller tools application 74 may also utilize the API and the listing performance data engine module 24 to provide seller's with access to item listing performance data. The seller tools application 74, in some embodiments, is a web-based application that is accessible via a web browser 76. In some embodiments, the seller tools application 74 may be a simplified version of what is ultimately made possible with the API. For example, the seller tools application 74 may provide some basic functionality allowing sellers to access the most basic data elements that comprise the listing performance data for their item listings.

In addition to tools and applications for providing sellers with access to listing performance data, an internal services module 78 may serve as an interface to the listing performance data engine module 24 for a number of internally accessible tools 80, for use by administrators of the online trading application 18. These internal tools 82 may be web-based (e.g., accessible via a web browser), or native desktop applications. In some embodiments, the tools for internal use may have a superset of the functionality offered to sellers. For instance, internal users may have access to certain data and functionality that sellers are restricted from accessing. In particular, the internal tools will generally provide access to data for all item listings in a category, or by keyword, whereas the seller tools will generally utilize an authentication method to provide listing performance data for only those item listings of a particular seller.

In some embodiments, the API supports requests and responses formatted as extensible markup language (XML) or as SOAP (simple object access protocol) messages. For instance, an HTTP POST call method supports requests formatted in XML. The response format for an XML formatted request is XML. An example might look like the following:

<findItem findItemDetailsByKeywordsRequest
xmlns="http://www.trade.com/market/search/services">
<keywords>apple iphone</keywords>
</findItemDetailsByKeywordsRequest>

Similarly, the HTTP POST call method supports requests formatted in accordance with the SOAP protocol. The response format for SOAP requests is SOAP. An example request might look as follows:

soap:Envelope xmlns:soap="http://www.w3.org/2003/05/soap-envelope"
xmlns="http://www.trade.com/market/search/services">
<soap:Header/>
<soap:Body>
<findItemDetailsByKeywordsRequest>
<keywords>apple iphone</keywords>
</findItemDetailsByKeywordsRequest>
</soap:Body>

In some embodiments, each API call consists of the following elements: a Service Endpoint, identifying an API Gateway; an HTTP Header, for example, specifying optional and required parameters, such as an authentication token or an API call name; Standard Input Fields, for example, defining parameters such as, entriesPerPage, which can be used to specify how many items are returned in a response, or a field to specify which items to include in the search, and which items to return from the search; and, Call-specific Input Fields, such as keywords or category identifiers that may be specific to certain API calls.

Figure 4:
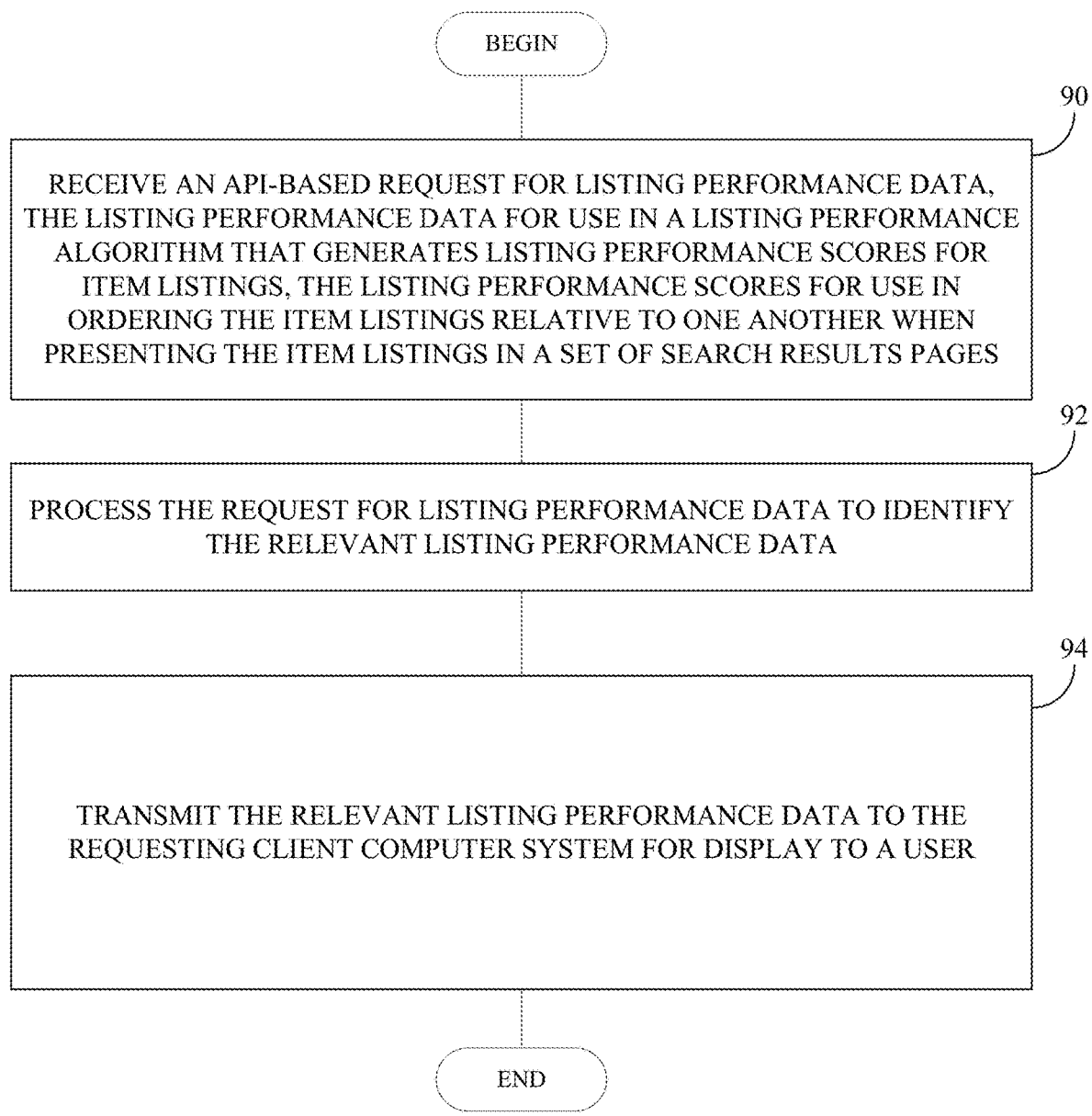
FIG. 4 illustrates an example of a method, according to an embodiment of the invention, for processing an application programming interface-based, or API-based, data request from a listing performance analysis application.

FIG. 4 illustrates an example of a method, according to an embodiment of the invention, for processing an application programming interface-based, or API-based, data request from a listing performance analysis application. At operation 90, a seller utilizes a listing performance analysis application residing and executing on a remote client computer system to generate a request for listing performance data that is directed to the online trading application. Specifically, the request is an API-based request that will be processed, for example, by a listing performance data engine module. The particular listing performance data requested will be dependent upon the API call, and various parameters specified in the request. In some embodiments, the request will include, or be associated with a prior, authentication request identifying the particular seller who is making the request. Accordingly, only the listing performance data associated with the item listings of the authenticated seller will be returned in response to the request. In general, the listing performance data being requested is data that is used by the online trading application to assign a ranking score (e.g., listing performance score) to each item listing that satisfies a search query. The listing performance scores are in turn used to order the item listings when the item listings are presented in a set of search results pages.

At method operation 92, the request for listing performance data is processed by the listing performance data engine module in order to identify the relevant listing performance data. In particular, relevant data includes only listing performance data associated with the seller's listing performance and data that is responsive to the particular API-based request. Finally, at method operation 94, the identified relevant listing performance data is communicated to the requesting application at the client computing system.

Figure 5:
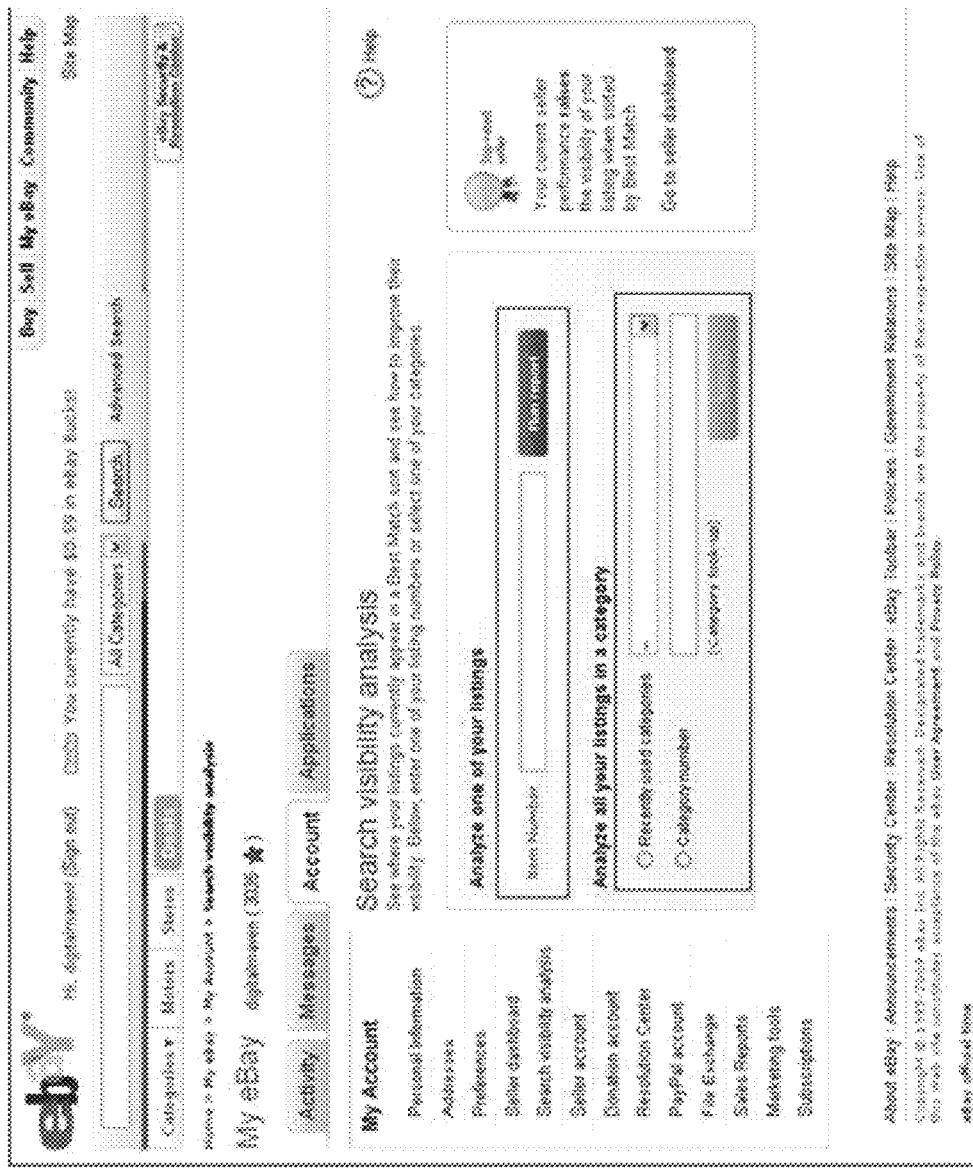
Figure 6:
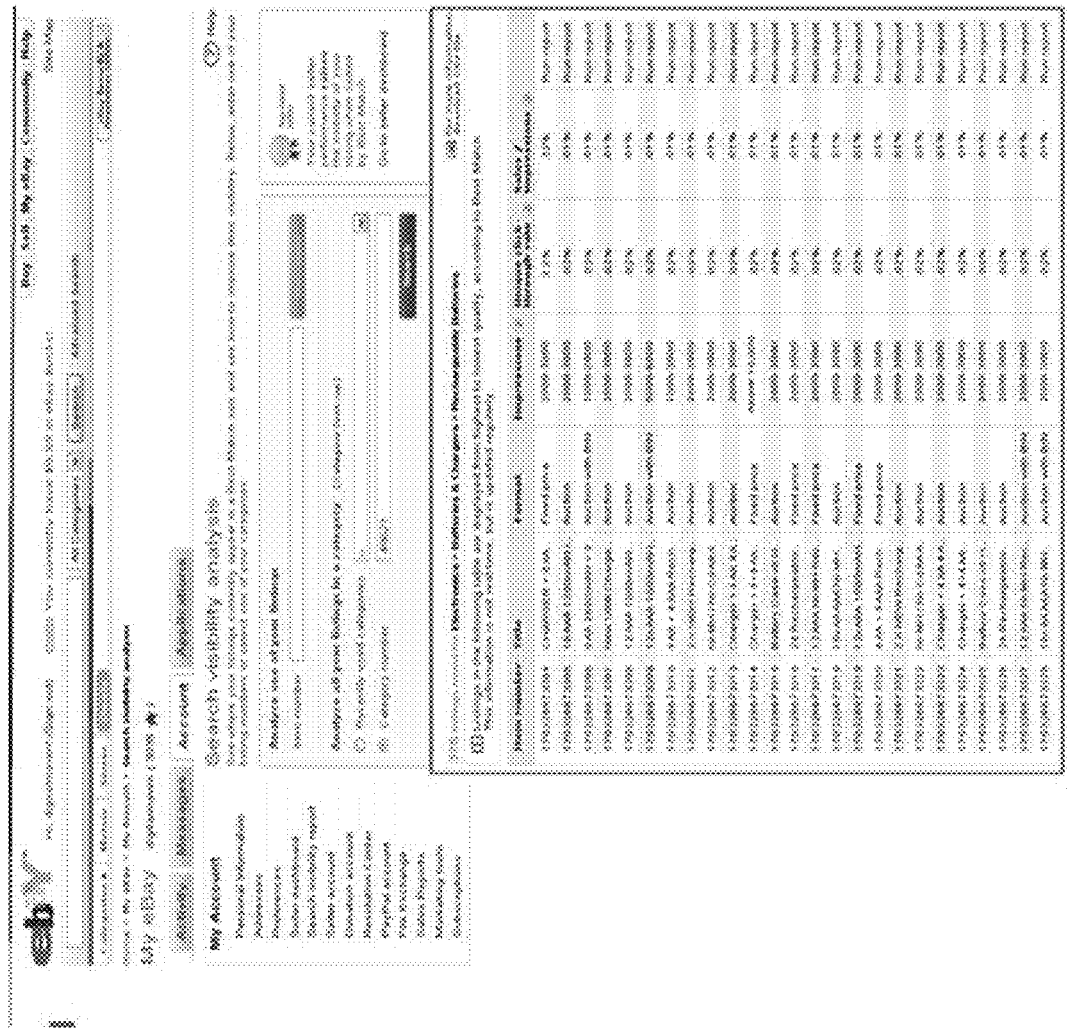
Figure 7:
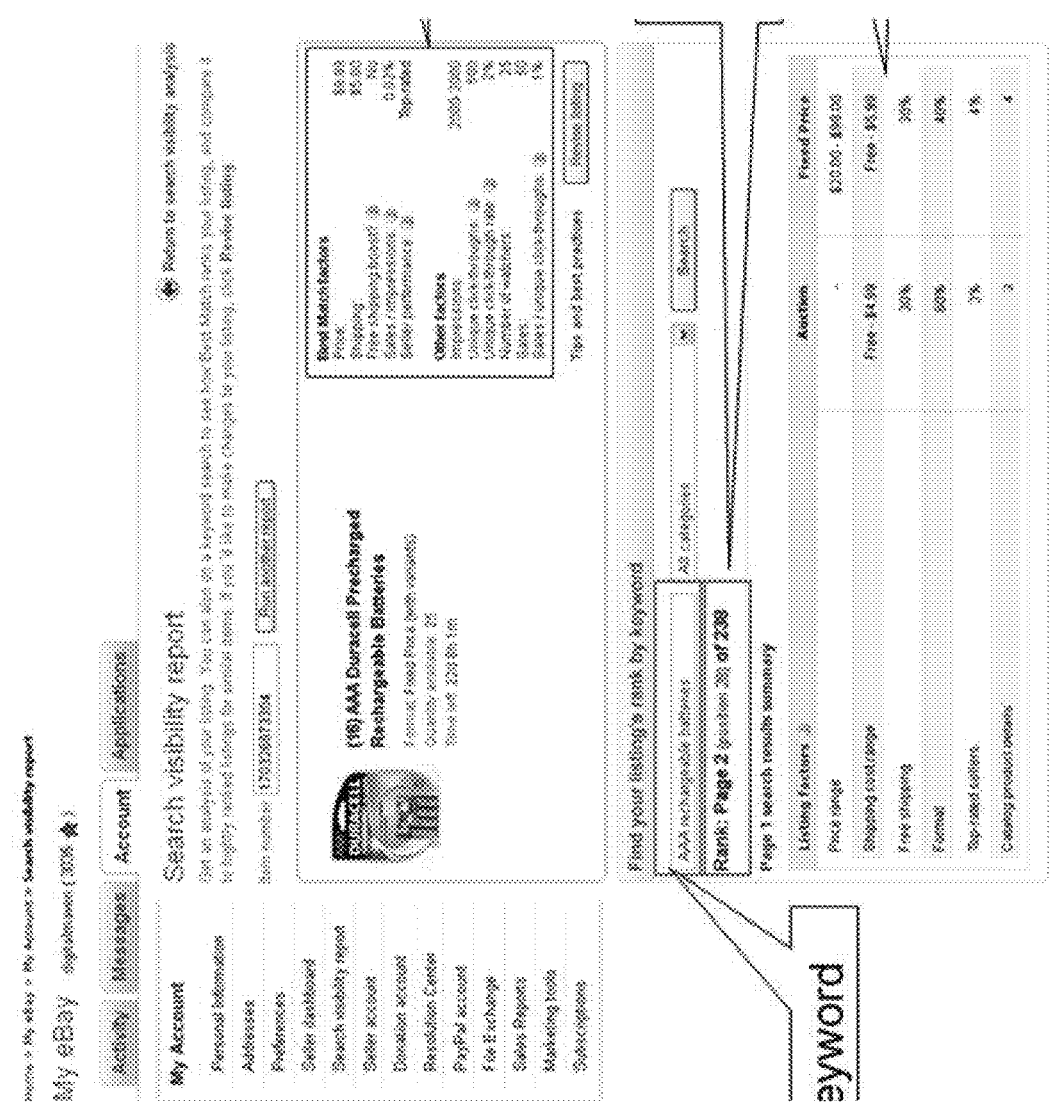
Figure 8:
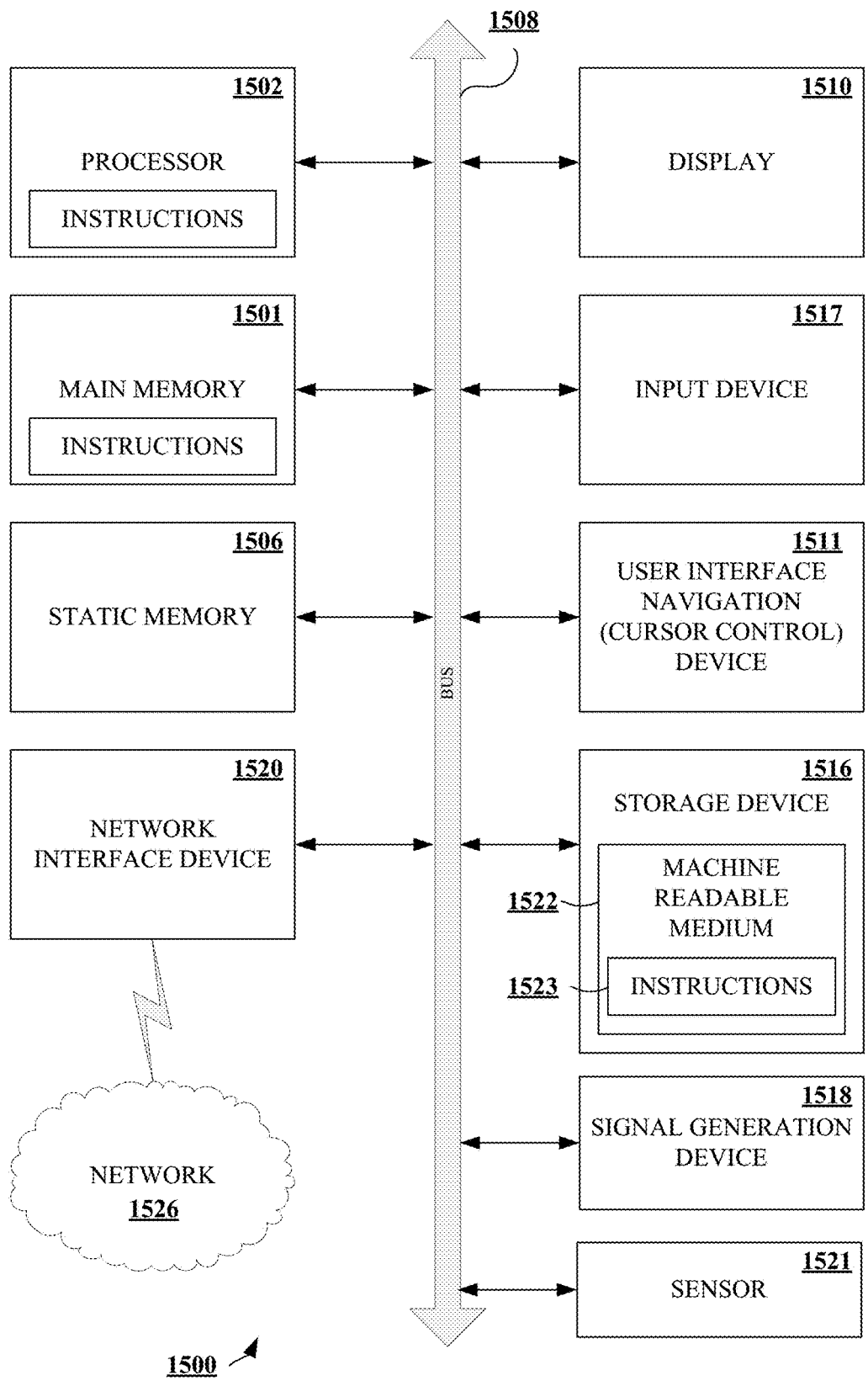
FIG. 8 is a block diagram of a machine in the form of a mobile device within which a set of instructions, for causing the machine to perform any one or more of the methodologies discussed herein, may be executed.

FIGS. 5, 6 and 7 illustrate example user interfaces for a listing performance analysis application, according to an embodiment of the invention. The specific user interface examples shown in FIGS. 5, 6 and 7 are provided for the purpose of conveying an understanding of the inventive concepts. In various embodiments, the actual user interfaces may vary greatly from what is specifically shown in FIGS. 5, 6 and 7, without departing from the spirit and nature of the claimed inventive subject matter.

As illustrated in FIG. 5, in some embodiments, a seller may be prompted to provide an item listing number, or alternatively, an identification of a category to which item listings might be assigned. For example, a mobile phone may be assigned to an "Electronics" or a "Mobile Phone" category. Therefore, by specifying the "Mobile Phone" category, the seller is able to retrieve listing performance data for all of the seller's item listings in the "Mobile Phone" category. Similarly, by specifying a particular item listing number, the seller will be able to view the particular item listing associated with the item listing number.

In the example shown in FIG. 5, the seller has already been authenticated, so any request for data will result in only data associated with the authenticated seller's item listings being returned in response. Additionally, because the seller has been authenticated, the user interface provides a seller performance rating for the seller, along with an indication of whether the seller's performance rating is helping or hurting the overall listing performance score assigned to the seller's item listings when a potential buyer performs a search request. A link to a "seller dashboard" may provide the seller with a more detailed view of his seller performance rating.

In the example user interface of FIG. 6, the listing performance data associated with a seller's item listings in a particular category are is shown. For instance, after a seller makes a request for listing performance data for item listings in a particular category, the particular listing performance data for those item listings in the category (in this case, the sub-category "Electronics->Batteries and Chargers->Rechargeable Batteries") are displayed. In this example, for each item listing in the category, listing performance data including the number of impressions, unique click through rate, and sales per impressions are displayed. In addition, for each item listing a button labeled "run report" is displayed, providing the seller with the option of requesting a detailed report for a particular item listing.

In the example user interface of FIG. 7, a detailed listing performance view for a particular item listing is shown. In this detailed view, a variety of item attributes are displayed for the item listing, along with other items of listing performance data. The user interface enables a seller to find the exact page and page position (e.g., slot or location within the page) at which an item listing would appear, if a seller was to perform a search containing a particular keyword or keywords. For example, in this example, the item listing would appear at position 28 of page two in the set of search results pages, if a potential buyer was to perform a keyword search with the keywords "AAA rechargeable batteries." With this tool, a seller can manipulate the description of his or her item listing and repeat the search to determine whether the new description improves or hurts the position of the item listing for a particular keyword query.

In addition to the exact position and page being displayed, the user interface shows aggregated listing performance data for the item listings that would appear in the first page of the search results pages, if a potential buyer was to perform a keyword query containing the identified keywords. For instance, in this example, the price range for fixed price format listings appearing in the first page of the search results pages is between $20.00 and $99.00. Given the seller's price of $9.00 for the item listing, the seller can determine that his price is on the low end of the price range, and therefore not likely to be hurting the listing performance score. Similarly, the aggregated listing performance data for the item listings appearing on the first page for a give query include information about the shipping cost range, the percentage of items with free shipping, the percentage of sellers ranked in the top sellers group, and other information.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

FIG. 13 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A computer-implemented method, comprising:
receiving, from a client computing system, a request for listing performance data for a specific item listing from a seller, the request specifying a keyword and/or a category;
processing the request to retrieve the listing performance data corresponding to the specific item listing;
determining at least one position value that indicates a position at which the specific item listing would appear to a potential buyer in a search results listing having a plurality of item listings based on a search using the keyword and/or the category; and
transmitting the listing performance data and the at least one position value to the client computing system for presentation to the seller.

2. The computer-implemented method of claim 1, wherein the request specifies the category and the listing performance data includes data for all item listings for the seller that are assigned to the category.

3. The computer-implemented method of claim 2, wherein, for each item listing assigned to the category, the listing performance data includes one or more items of information selected from: an impression count, a unique click-through rate, and a ratio of the number of sales per the number of impressions.

4. The computer-implemented method of claim 1, wherein the listing performance data includes a seller performance rating and an indication of how the seller performance rating affects the at least one position value for the specific item listing.

5. The computer-implemented method of claim 1, wherein the request includes the keyword, and the listing performance data includes information identifying a number of times the specific item listing has been presented in a search results page as a result of processing a search request containing the keyword.

6. The computer-implemented method of claim 1, further comprising: transmitting, to the client computing system, aggregated listing performance data for one or more other item listings that would appear in a search results page if a user initiated a search query containing the keyword and/or the category included in the request.

7. The computer-implemented method of claim 1, wherein the request includes an item identifier for the specific item listing.

8. The computer-implemented method of claim 1, wherein the at least one position value comprises a page number.

9. The computer-implemented method of claim 1, wherein the at least one position value comprises a page position value.

10. A computer system comprising:
one or more processors; and
one or more machine-readable media storing computer-useable instructions that, when used by the one or more processors, causes the one or more processors to perform operations comprising:
receiving, from a client computing system, a request for listing performance data for a specific item listing from a seller, the request specifying a keyword and/or a category;
processing the request to retrieve the listing performance data corresponding to the specific item listing;
determining at least one position value that indicates a position at which the specific item listing would appear to a potential buyer in a search results listing having a plurality of item listings based on a search using the keyword and/or the category; and transmitting the listing performance data and the at least one position value to the client computing system for presentation to the seller.

11. The computer system of claim 10, wherein the request specifies the category and the listing performance data includes data for all item listings for the seller that are assigned to the category.

12. The computer system of claim 11, wherein, for each item listing assigned to the category, the listing performance data includes one or more items of information selected from: an impression count, a unique click-through rate, and a ratio of the number of sales per the number of impressions.

13. The computer system of claim 10, wherein the listing performance data includes a seller performance rating and an indication of how the seller performance rating affects the at least one position value for the specific item listing.

14. The computer system of claim 10, wherein the request includes the keyword, and the listing performance data includes information identifying a number of times the specific item listing has been presented in a search results page as a result of processing a search request containing the keyword.

15. The computer system of claim 10, further comprising: transmitting, to the client computing system, aggregated listing performance data for one or more other item listings that would appear in a search results page if a user initiated a search query containing the keyword and/or the category included in the request.

16. The computer system of claim 10, wherein the request includes an item identifier for the specific item listing.

17. The computer system of claim 10, wherein the at least one position value comprises a page number.

18. The computer system of claim 10, wherein the at least one position value comprises a page position value.

19. One or more machine-readable media storing computer-useable instructions that, when used by one or more devices, cause the one or more devices to perform operations comprising:
transmitting, from a client computing system to a server, a request for listing performance data for a specific item listing from a seller, the request specifying a keyword and/or a category, the request causing the server to process the request to retrieve the listing performance data corresponding to the specific item listing and determine at least one position value that indicates a position at which the specific item listing would appear to a potential buyer in a search results listing having a plurality of item listings based on a search using the keyword and/or the category; and
receiving, at the client computing system, the listing performance data and the at least one position value for presentation to the seller.

20. The one or more machine-readable media of claim 19, wherein the at least one position value comprises a page number and a page position value.

* * * * *